(12) United States Patent
Iwamoto et al.

(10) Patent No.: US 11,404,922 B2
(45) Date of Patent: Aug. 2, 2022

(54) ROTARY ELECTRIC MACHINE HAVING TORQUE TRANSMITTING PORTION AND ROTOR CORE RETAINING PORTION

(71) Applicant: Mitsubishi Electric Corporation, Tokyo (JP)

(72) Inventors: Kazuyuki Iwamoto, Tokyo (JP); Motoaki Kimura, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 16/649,769

(22) PCT Filed: Oct. 30, 2017

(86) PCT No.: PCT/JP2017/039184
§ 371 (c)(1),
(2) Date: Mar. 23, 2020

(87) PCT Pub. No.: WO2019/087263
PCT Pub. Date: May 9, 2019

(65) Prior Publication Data
US 2020/0280223 A1 Sep. 3, 2020

(51) Int. Cl.
*H02K 1/18* (2006.01)
*H02K 1/28* (2006.01)

(52) U.S. Cl.
CPC .................... *H02K 1/18* (2013.01)

(58) Field of Classification Search
CPC .. H02K 1/28; H02K 1/30; H02K 1/27; H02K 1/2706; H02K 11/21; H02K 11/215
(Continued)

(56) References Cited

U.S. PATENT DOCUMENTS

| 2005/0011689 | A1* | 1/2005 | Tajima | B60K 6/40 903/951 |
| 2014/0070649 | A1* | 3/2014 | Fulton | H02K 19/00 29/598 |
| 2021/0328479 | A1* | 10/2021 | Großpietsch | F16H 45/02 |

FOREIGN PATENT DOCUMENTS

| CN | 1283156 A | 2/2001 |
| JP | 56-106029 U | 8/1981 |

(Continued)

OTHER PUBLICATIONS

Search Report dated Jan. 30, 2018, issued by the International Searching Authority in counterpart International Patent Application No. PCT/JP2017/039184 (PCT/ISA/210).

(Continued)

*Primary Examiner* — Michael Andrews
(74) *Attorney, Agent, or Firm* — Sughrue Mion, PLLC; Richard C. Turner

(57) ABSTRACT

According to the present invention, provided is a rotary electric machine, which is to be connected to at least one of a first torque input/output shaft and a second torque input/output shaft, and includes a stator and a rotor. The rotor of the rotary electric machine includes: a rotor core; a torque transmitting portion, which is connected to at least one of the first torque input/output shaft and the second torque input/output shaft, and is formed of a plate-shaped member; and a rotor core retaining portion, which is retained on the torque transmitting portion, is configured to retain the rotor core, and is formed of a plate-shaped member.

8 Claims, 6 Drawing Sheets

(58) Field of Classification Search
USPC .......................................................... 310/91
See application file for complete search history.

(56)              References Cited

FOREIGN PATENT DOCUMENTS

| | | |
|---|---|---|
| JP | 57-155982 U | 9/1982 |
| JP | 60-034740 U | 3/1985 |
| JP | 11-332010 A | 11/1999 |
| JP | 2004-76592 A | 3/2004 |
| JP | 2005-57832 A | 3/2005 |
| JP | 2015-210790 A | 8/2005 |
| JP | 2005-269717 A | 9/2005 |
| WO | 99/22955 A1 | 5/1999 |

OTHER PUBLICATIONS

Written Opinion dated Jan. 30, 2018, issued by the International Searching Authority in counterpart International Patent Application No. PCT/JP2017/039184 (PCT/ISA/237).
Communication dated Jun. 22, 2021 from the Japanese Patent Office in Application No. 2019-550015.
Communication dated Oct. 20, 2021, issued by the National Intellectual Property Office of the P.R.C. in application No. 201780096138.8.

\* cited by examiner

ROTARY ELECTRIC MACHINE HAVING TORQUE TRANSMITTING PORTION AND ROTOR CORE RETAINING PORTION

This application is a National Stage of International Application No. PCT/JP2017/039184 filed Oct. 30, 2017 and the disclosures of which are incorporated herein in their entirety by reference.

TECHNICAL FIELD

The present invention relates to a rotary electric machine to be used for a hybrid vehicle driving apparatus.

BACKGROUND ART

There are some types of hybrid vehicle driving apparatus. Among those types, there exists a type in which a rotary electric machine is interposed between an engine and a power transmission mechanism configured to transmit power to wheels. In the hybrid vehicle driving apparatus of this type, torque produced by the rotary electric machine can be added to torque produced by the engine. In the rotary electric machine to be used for such apparatus, a boss portion configured to retain a rotor core is required to bear large torque produced by the engine. Thus, the boss portion is strengthened (see, for example, Patent Literature 1).

CITATION LIST

Patent Literature

[PTL 1] JP 2005-210790 A

SUMMARY OF INVENTION

Technical Problem

However, this rotary electric machine has the following problem. For the rotary electric machine described in Patent Literature 1, the boss portion is manufactured by, for example, casting, and is produced from a member having a large thickness. As a result, cutting work is mainly performed to manufacture the boss portion, which leads to poor productivity of the boss portion.

The present invention has been made to solve the above-mentioned problem, and has an object to provide a rotary electric machine including a boss portion excellent in productivity.

Solution to Problem

According to one embodiment of the present invention, there is provided a rotary electric machine, which is to be connected to at least one of a first torque input/output shaft and a second torque input/output shaft and includes a stator and a rotor. The rotor of the rotary electric machine includes: a rotor core; a torque transmitting portion, which is connected to at least one of the first torque input/output shaft and the second torque input/output shaft, and is formed of a plate-shaped member; and a rotor core retaining portion, which is retained on the torque transmitting portion, is configured to retain the rotor core, and is formed of a plate-shaped member.

Advantageous Effects of Invention

According to the rotary electric machine of the present invention, the torque transmitting portion and the rotor core retaining portion are each formed of the plate-shaped member, and hence can be formed through press working excellent in productivity. The torque transmitting portion and the rotor core retaining portion form the boss portion. Thus, the rotary electric machine including the boss portion excellent in productivity can be provided.

DESCRIPTION OF EMBODIMENTS

Now, a rotary electric machine according to embodiments of the present invention is described with reference to the drawings. Note that, in each of the drawings, the same or corresponding portions are denoted by the same reference symbols, and the overlapping description thereof is omitted.

First Embodiment

Figure 1:
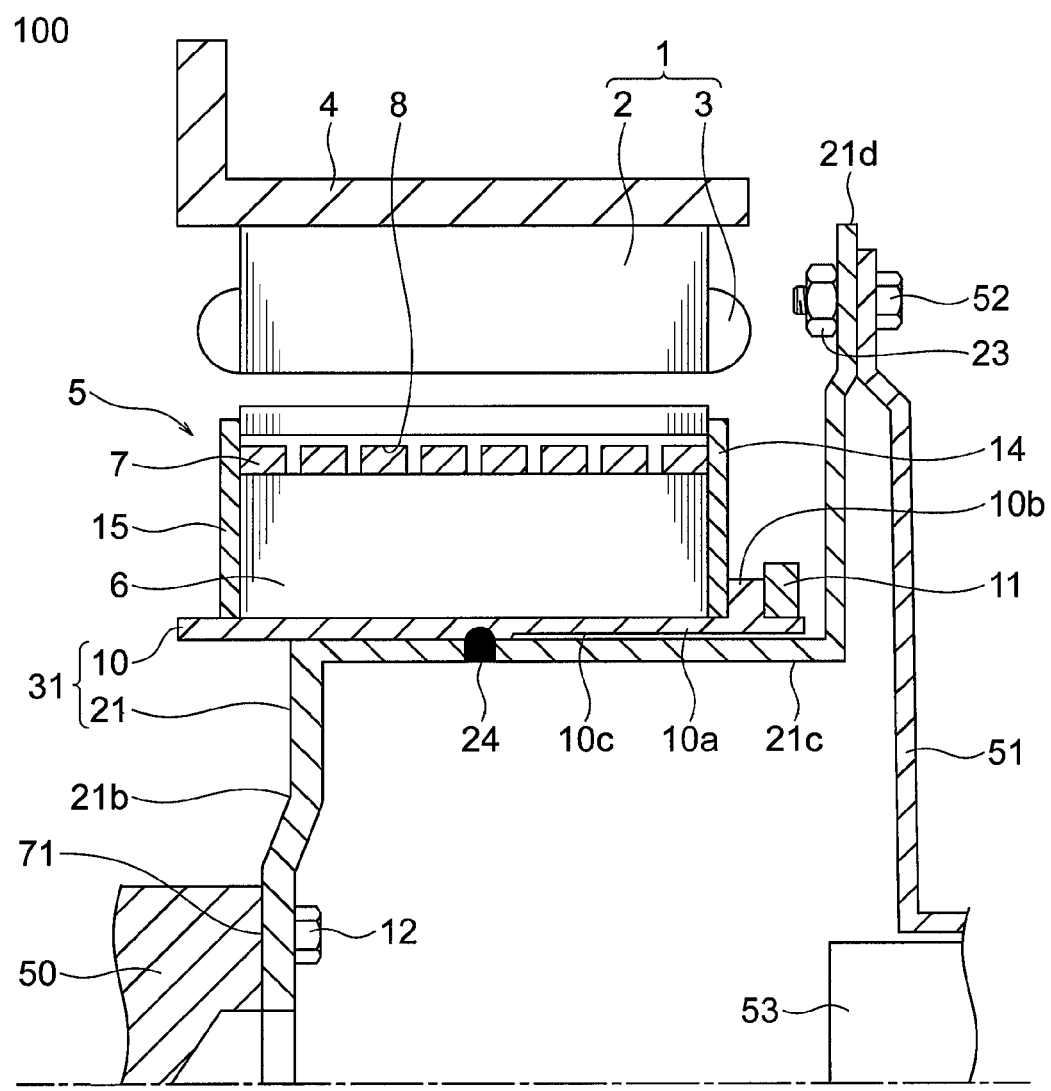
FIG. 1 is a sectional view for illustrating a rotary electric machine according to a first embodiment of the present invention taken along an axial direction of a rotation axis thereof.

FIG. 1 is a sectional view for illustrating a rotary electric machine according to a first embodiment of the present invention taken along an axial direction of a rotation axis thereof. The rotary electric machine has a symmetrical shape with respect to the rotation axis, and hence only a half of the rotary electric machine is illustrated in FIG. 1.

An assist motor 100 is provided between a crankshaft 50 and a main shaft 53 arranged coaxially with each other. The crankshaft 50 is a rotary shaft of an in-vehicle engine, and the main shaft 53 is a rotary shaft of a transmission. The assist motor 100 includes a stator 1, a rotor 5, and a rotation sensor rotor 11. The assist motor 100 serves as a rotary electric machine. Further, the crankshaft 50 serves as a first torque input/output shaft, and the main shaft 53 serves as a second torque input/output shaft.

The stator 1 is fixed to an inner face of a frame 4 having a cylindrical shape. The stator 1 includes a stator core 2 and a stator coil 3. The stator core 2 is formed of steel sheets laminated in an axial direction of the crankshaft 50. The stator coil 3 is wound around the stator core 2 about an axis extending in a radial direction of the crankshaft 50.

The rotor 5 is opposed to the stator 1 on a radially inner side of the crankshaft 50. The rotor 5 includes a rotor core 6, magnets 7, a boss inner peripheral ring 10, an end plate 14, an end plate 15, and a boss cup 21. The boss inner peripheral ring 10 serves as a rotor core retaining portion, and the boss cup 21 serves as a torque transmitting portion.

The boss cup 21 includes a plate portion 21b, a cylinder portion 21c, and an outer edge portion 21d formed continuously with each other. The plate portion 21b, the cylinder portion 21c, and the outer edge portion 21d are formed by performing press working on a plate-shaped member. The plate portion 21b, the cylinder portion 21c, and the outer edge portion 21d are integrally rotated.

The plate portion 21b has a disk shape having a center matched with a center axis of the crankshaft 50. A female thread is formed in the crankshaft 50. The plate portion 21b is connected at a connection region 71 to the crankshaft 50 with a bolt 12.

The cylinder portion 21c has a cylindrical shape, and is retained on an outer periphery of the plate portion 21b through fitting. In this case, the rotor core 6 is rotated by an electromagnetic force, and hence a centrifugal force is applied to the cylinder portion 21c. Thus, it is required to retain the cylinder portion 21c and the plate portion 21b so as to prevent the cylinder portion 21c and the plate portion 21b from being disengaged by the centrifugal force.

The outer edge portion 21d is formed by bending an end portion of the cylinder portion 21c, which is not connected to the plate portion 21b, to a radially outer side of the main shaft 53. At an outer periphery of the outer edge portion 21d, the outer edge portion 21d is fixed to a torque converter 51 with a bolt 52 and a press nut 23. The torque converter 51 includes a stepped portion formed midway between the radially outer side of the main shaft 53 and a center of the torque converter 51. A center side of the torque converter 51 is fixed to a side face of the main shaft 53.

The boss inner peripheral ring 10 is retained on an outer peripheral side of the cylinder portion 21c. The boss inner peripheral ring 10 is formed by performing press working on an iron-based plate-shaped member. The boss inner peripheral ring 10 includes a cylindrical portion 10a having a cylindrical shape, and a collar portion 10b being a flange formed at one end of the cylindrical portion 10a.

The cylindrical portion 10a is retained at a welded portion 24 on the cylinder portion 21c from the inner face side of the cylinder portion 21c of the boss cup 21 through spot welding. The cylindrical portion 10a may be retained on the cylinder portion 21c through fitting. The cylindrical portion 10a protrudes toward the crankshaft 50 side with respect to the connection region 71 of the plate portion 21b connected to the crankshaft 50. A gap 10c is defined between the cylindrical portion 10a and the cylinder portion 21c on the main shaft 53 side with respect to the welded portion 24.

The rotor core 6 has a cylindrical shape, and is retained on the outer periphery of the cylindrical portion 10a. The end plate 15 is provided on the crankshaft 50 side of the rotor core 6. The end plate 14 is provided on the main shaft 53 side of the rotor core 6. The rotor core 6 is formed of steel sheets laminated in the axial direction of the crankshaft 50, and the steel sheets are integrated by being sandwiched between the end plate 14 and the end plate 15. A plurality of magnet receiving holes 8 are formed in vicinities of an outer peripheral face of the rotor core 6. The magnets 7 are received in the magnet receiving holes 8, respectively. The magnets 7 are opposed to the stator core 2. The rotation sensor rotor 11 having a ring shape is mounted on the main shaft 53 side of the end plate 14 across the collar portion 10b.

Figure 2:
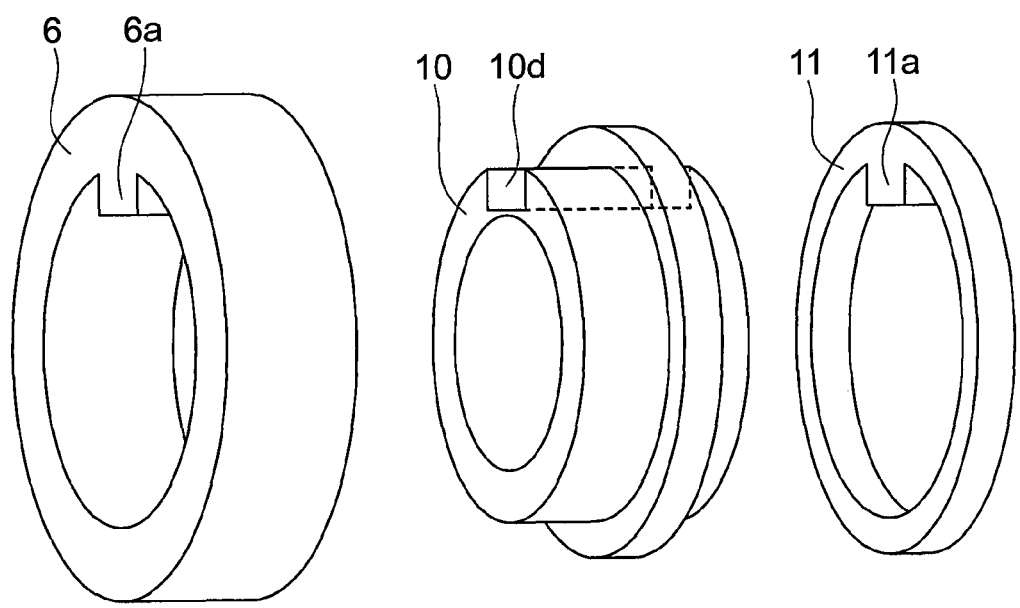
FIG. 2 is an exploded perspective view for illustrating a rotor core, a rotor boss, and a rotation sensor rotor of FIG. 1.

FIG. 2 is an exploded perspective view for illustrating the rotor core 6, the boss inner peripheral ring 10, and the rotation sensor rotor 11 of FIG. 1. A key 6a being a projecting portion is formed on an inner peripheral side of the rotor core 6. A key groove 10d being a recessed portion is formed on the outer peripheral side of the boss inner peripheral ring 10. A key 11a being a projecting portion is formed on the inner peripheral side of the rotation sensor rotor 11. When the key 6a is fitted into the key groove 10d, the rotor core 6 is retained on the boss inner peripheral ring 10. Further, when the key 11a is fitted into the key groove 10d, the rotation sensor rotor 11 is retained on the boss inner peripheral ring 10. Therefore, the rotor core 6 and the rotation sensor rotor 11 are rotated integrally with the boss inner peripheral ring 10.

Actions of the rotary electric machine according to the first embodiment are described with reference to FIG. 1.

A first torque is transmitted from the crankshaft 50 to the boss cup 21. The assist motor 100 including the stator 1 and the rotor 5 produces a second torque on the boss cup 21. A third torque obtained by adding the second torque to the first torque is transmitted from the boss cup 21 to the main shaft 53 via the torque converter 51.

A boss portion 31 of the rotor 5 includes the boss inner peripheral ring 10 and the boss cup 21. The boss inner peripheral ring 10 and the boss cup 21 are each formed by performing press working on the plate-shaped member, and are integrated together at the time of assembly of the assist motor 100. Thus, the boss inner peripheral ring 10 can be subjected to working before assembled to the boss cup 21. Further, the boss inner peripheral ring 10 and the boss cup 21 are each lightweight and easy to handle. Moreover, working such as cutting is easily performed on the boss inner peripheral ring 10 and the boss cup 21, and hence the boss inner peripheral ring 10 and the boss cup 21 can be formed so as to have complicated shapes. Thus, production of the boss portion 31 is easily performed.

The cylindrical portion 10a of the boss inner peripheral ring 10 is retained on the cylinder portion 21c of the boss cup 21 through welding. With this configuration, at the welded portion 24, a degree of coupling between the cylindrical portion 10a and the cylinder portion 21c is increased, and durability of the boss portion 31 is also increased.

When the rotor 5 is rotated, the centrifugal force is applied to the rotor core 6. Thus, due to the centrifugal force applied to the rotor core 6, the cylinder portion 21c of the boss cup 21 is liable to expand to the radially outer side. The crankshaft 50 side of the cylinder portion 21c is fixed to the crankshaft 50 through intermediation of the plate portion 21b. Further, the main shaft 53 side of the cylinder portion 21c is fixed to the main shaft 53 through intermediation of the outer edge portion 21d and the torque converter 51. That is, the cylinder portion 21c is fixed along the axial direction of the cylinder portion 21c on both sides thereof. Thus, the cylinder portion 21c is prevented from expanding toward the radially outer side. Further, there is a space on an inner side of the entire boss cup 21, and hence, for example, a clutch can be accommodated in the space.

The cylindrical portion 10a protrudes toward the crankshaft 50 side with respect to the connection region 71 of the plate portion 21b connected to the crankshaft 50. In this case, in the axial direction of the cylinder portion 21c, a length of the cylinder portion 21c is smaller than a length of the cylindrical portion 10a. A rotational force of the rotor core 6 is applied as a torsional force to the cylinder portion 21c via the cylindrical portion 10a. When the length of the cylinder portion 21c is smaller than the length of the cylindrical portion 10a in the axial direction of the boss cup 21, torsional rigidity of the cylinder portion 21c can be increased. That is, the boss cup 21 can be made less liable to deform due to rotation of the rotor 5.

The boss inner peripheral ring 10 is made of the same iron-based material as that for the rotor core 6. When the same material as that for the rotor core 6 is used for the boss inner peripheral ring 10 as described above, both the boss inner peripheral ring 10 and the rotor core 6 have the same coefficient of thermal expansion. Thus, the rotor core 6 can be prevented from being separated from the boss inner peripheral ring 10 due to temperature increase.

The key 11a is fitted into the key groove 10d so that the rotation sensor rotor 11 is rotated integrally with the boss inner peripheral ring 10. With this configuration, the rotor core 6 can be positioned with high accuracy with respect to a rotational direction of the rotor 5.

As described above, the assist motor 100 according to the first embodiment is connected to the crankshaft 50 and the main shaft 53, and includes the stator 1 and the rotor 5. The rotor 5 includes the rotor core 6, the boss cup 21, and the boss inner peripheral ring 10. The boss cup 21 is connected to the crankshaft 50 and the main shaft 53, and is formed of the plate-shaped member. The boss inner peripheral ring 10 is retained on the boss cup 21, is configured to retain the rotor core 6, and is formed of the plate-shaped member.

In the assist motor 100 according to the first embodiment, the plate-shaped member is used for each of the boss cup 21 and the boss inner peripheral ring 10. Thus, the boss inner peripheral ring 10 and the boss cup 21 can be formed through press working excellent in productivity. When the assist motor 100 is assembled, the boss cup 21 and the boss inner peripheral ring 10 are assembled, to thereby form the boss portion 31. Accordingly, the rotary electric machine including the boss portion excellent in productivity can be provided.

The boss cup 21 includes the plate portion 21b having a disk shape, and the cylinder portion 21c having a cylindrical shape and being fixed to the plate portion 21b. The plate portion 21b is connected to the crankshaft 50. The cylinder portion 21c retains the boss inner peripheral ring 10. Through production of the boss cup 21 in a divided manner, the plate portion 21b and the cylinder portion 21c can be formed into complex shapes.

The boss inner peripheral ring 10 is retained on the boss cup 21 through welding. With this configuration, the degree of coupling between the boss inner peripheral ring 10 and the boss cup 21 is increased, and durability of the boss portion 31 is increased.

The boss inner peripheral ring 10 is made of the same iron-based material as that for the rotor core 6. Thus, the boss inner peripheral ring 10 and the rotor core 6 have the same coefficient of thermal expansion. Accordingly, the rotor core 6 can be prevented from being separated from the boss inner peripheral ring 10 due to temperature increase.

The rotation sensor rotor 11 configured to measure a rotation angle is mounted to the rotor 5. With this configuration, the rotor core 6 can be positioned with high accuracy with respect to the rotational direction of the rotor 5.

The boss inner peripheral ring 10 protrudes toward the crankshaft 50 side with respect to the connection region 71 of the boss cup 21 connected to the crankshaft 50. Thus, torsional rigidity of the cylinder portion 21c of the boss cup 21 can be increased. Accordingly, the boss cup 21 can be made less deformable due to rotation of the rotor 5.

The boss cup 21 is connected to the crankshaft 50 and the main shaft 53. When the rotor 5 is rotated, the boss cup 21 is liable to expand outward due to the centrifugal force. The boss cup 21 is fixed along the axial direction of the boss cup 21 on the both sides thereof. Thus, the boss cup 21 is prevented from expanding toward the radially outer side of the boss cup 21.

Second Embodiment

Next, a rotary electric machine according to a second embodiment is described with reference to FIG. 3. In the second embodiment, the boss cup 21 is not connected directly to the main shaft 53, but is connected to the main shaft 53 through intermediation of the crankshaft 50.

Figure 3:
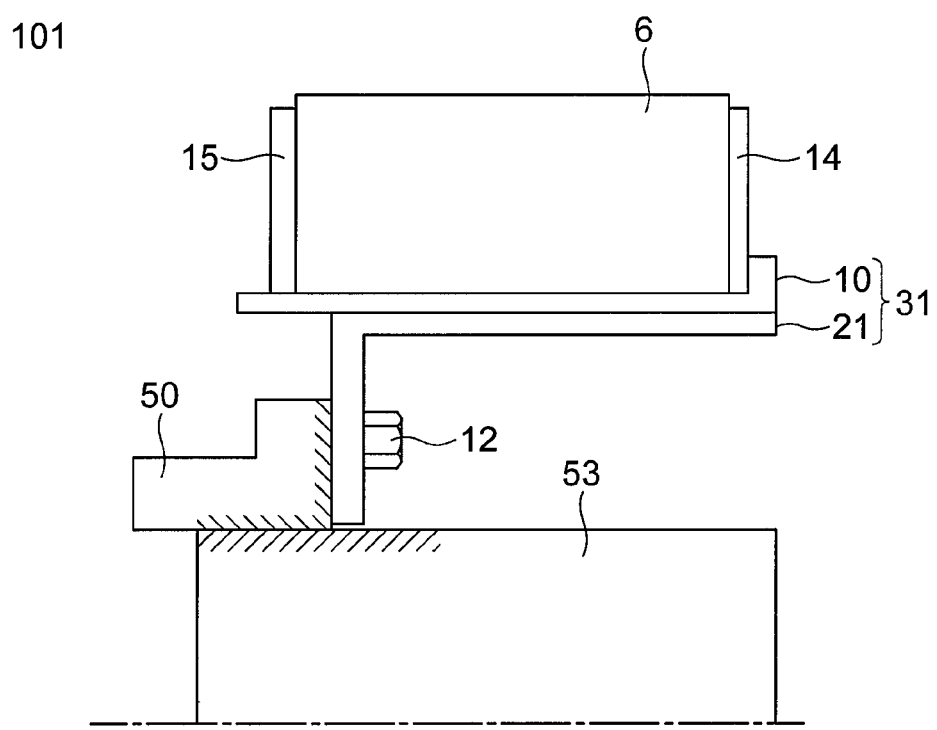
FIG. 3 is a sectional view for illustrating a rotary electric machine according to a second embodiment taken along an axial direction of a rotation axis thereof.

FIG. 3 is a sectional view for illustrating the rotary electric machine according to the second embodiment taken along an axial direction of a rotation axis thereof. In an assist motor 101 according to the second embodiment, the crankshaft 50 is connected directly to the main shaft 53 through spline coupling. The boss cup 21 is fixed to the crankshaft 50 with the bolt 12.

The assist motor 101 according to the second embodiment is connected to the crankshaft 50. The rotor of the assist motor 101 includes the rotor core 6, the boss cup 21, and the boss inner peripheral ring 10. The boss cup 21 is connected to the crankshaft 50, and is formed of the plate-shaped member. The boss inner peripheral ring 10 is retained on the boss cup 21, configured to retain the rotor core 6, and formed of the plate-shaped member.

In the assist motor 101 according to the second embodiment, the plate-shaped member is used for each of the boss cup 21 and the boss inner peripheral ring 10. Thus, the boss inner peripheral ring 10 and the boss cup 21 can be formed through press working excellent in productivity. When the assist motor 101 is assembled, the boss cup 21 and the boss inner peripheral ring 10 are assembled, to thereby form the boss portion 31. Accordingly, the rotary electric machine including the boss portion excellent in productivity can be provided.

Third Embodiment

Next, a rotary electric machine according to a third embodiment is described with reference to FIG. 4. In the third embodiment, the boss cup 21 is sandwiched between the crankshaft 50 and the main shaft 53.

Figure 4:
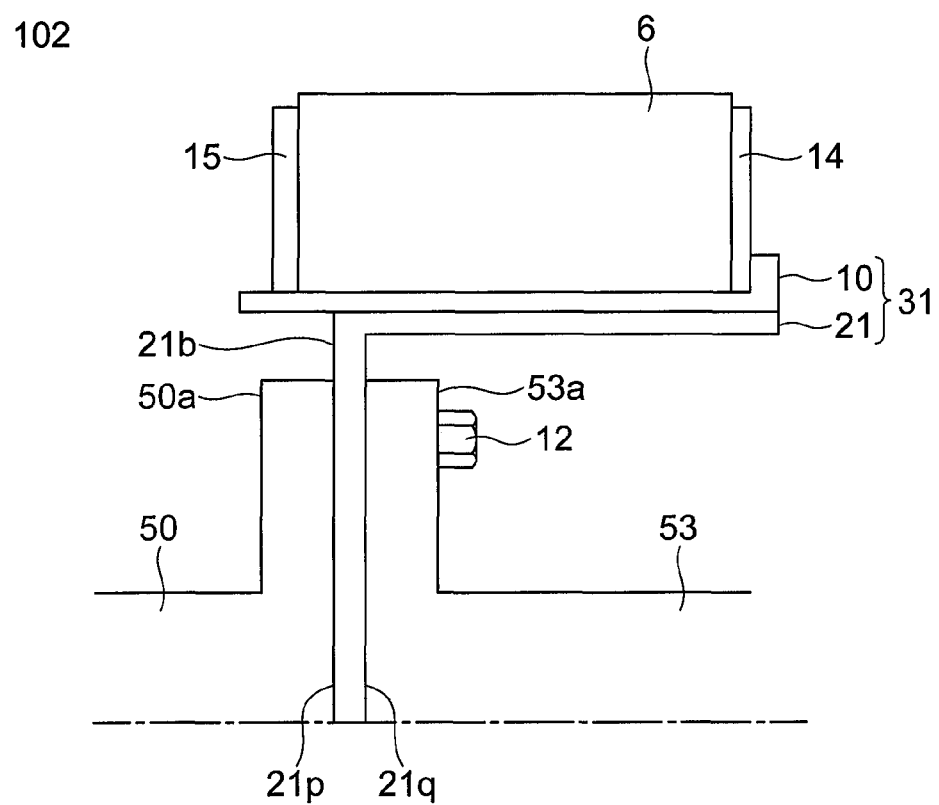
FIG. 4 is a sectional view for illustrating a rotary electric machine according to a third embodiment taken along an axial direction of a rotation axis thereof.

FIG. 4 is a sectional view for illustrating the rotary electric machine according to the third embodiment taken along an axial direction of a rotation axis thereof. In an assist motor 102 according to the third embodiment, the crankshaft 50 includes a flange portion 50a. Further, the main shaft 53 includes a flange portion 53a. The plate portion 21b of the boss cup 21 is sandwiched between the flange portion 50a and the flange portion 53a, and is fixed with the bolt 12.

In this case, the plate portion 21b of the boss cup 21 includes a first coupling face 21p and a second coupling face 21q. On the first coupling face 21p, the plate portion 21b is coupled to the flange portion 50a. Further, on the second coupling face 21q, the plate portion 21b is coupled to the flange portion 53a. The first coupling face 21p and the second coupling face 21q are front and back faces opposed to each other. Cutting work is performed on the first coupling face 21p and the second coupling face 21q, thereby increasing parallelism between those faces. The first coupling face 21p forms a first face, and the second coupling face 21q forms a second face.

The plate portion 21b is sandwiched between and coupled to the flange portion 50a and the flange portion 53a. With this configuration, torsional rigidity of the boss cup 21 can be increased when rotational power is transmitted from the crankshaft 50 to the main shaft 53.

Further, the parallelism between the first coupling face 21p and the second coupling face 21q is increased through cutting work. In this manner, the parallelism can be increased when the plate portion 21b is assembled to the flange portion 50a of the crankshaft 50 and the flange portion 53a of the main shaft 53.

In the assist motor 102 according to the third embodiment, the boss cup 21 is sandwiched between and coupled to the crankshaft 50 and the main shaft 53. With this configuration, torsional rigidity of the boss cup 21 can be increased.

The boss cup 21 includes the first coupling face 21p and the second coupling face 21q. On the first coupling face 21p, the boss cup 21 is coupled to the crankshaft 50. On the second coupling face 21q, the boss cup 21 is coupled to the main shaft 53. The first coupling face 21p is parallel to the second coupling face 21q. With this configuration, the parallelism can be increased when the boss cup 21 is assembled to the crankshaft 50 and the main shaft 53.

Fourth Embodiment

Next, a rotary electric machine according to a fourth embodiment is described with reference to FIG. 5. The fourth embodiment is a combination of the first embodiment and the third embodiment. That is, one side of the boss cup 21 is connected to the main shaft 53 through intermediation of a torque converter 54 as in the first embodiment. Further, another side of the boss cup 21 is sandwiched between the crankshaft 50 and the main shaft 53 as in the third embodiment.

Figure 5:
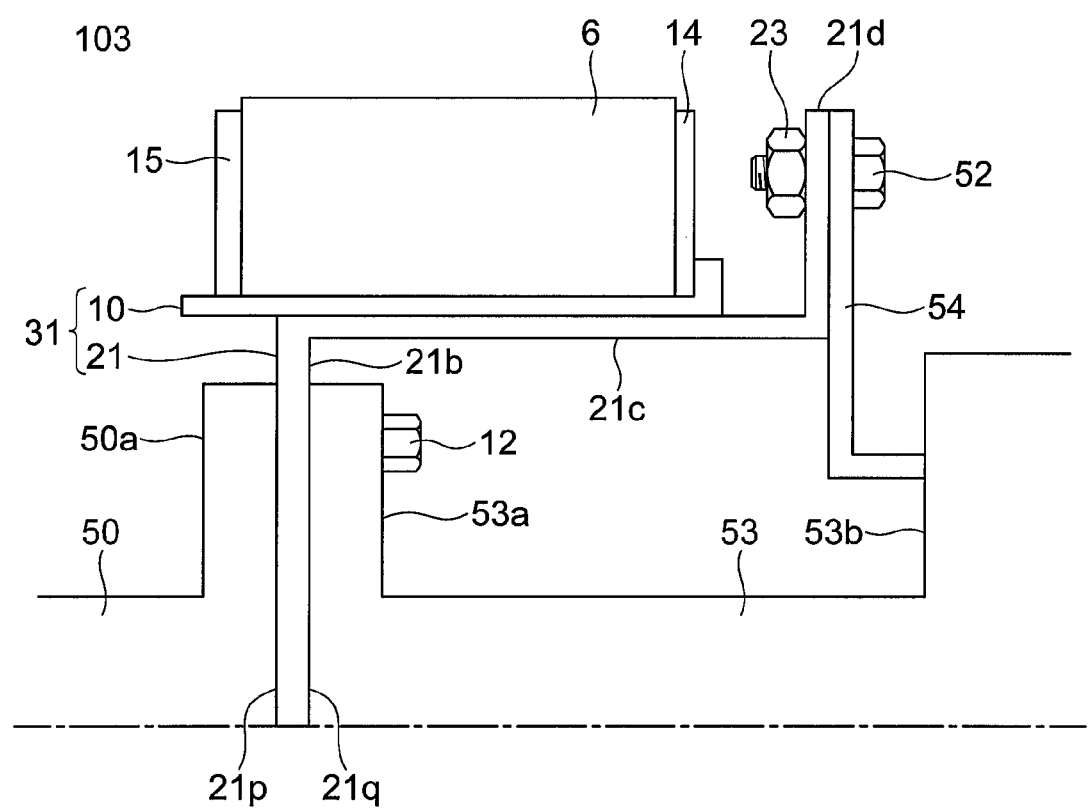
FIG. 5 is a sectional view for illustrating a rotary electric machine according to a fourth embodiment taken along an axial direction of a rotation axis thereof.

FIG. 5 is a sectional view for illustrating the rotary electric machine according to the fourth embodiment taken along an axial direction of a rotation axis thereof. In an assist motor 103 according to the fourth embodiment, the crankshaft 50 includes a flange portion 50a. Further, the main shaft 53 includes a flange portion 53a. The plate portion 21b of the boss cup 21 is sandwiched between the flange portion 50a and the flange portion 53a, and is fixed with the bolt 12.

The main shaft 53 includes a large-diameter portion 53b formed on a side apart from the crankshaft 50. A shaft diameter of the main shaft 53 is increased in the large-diameter portion 53b. One end of the torque converter 54 having an L-shaped cross section is fixed to the large-diameter portion 53b. The torque converter 54 extends toward the crankshaft 50, bends midway, and extends from a center side toward the radially outer side of the main shaft 53. The torque converter 54 is connected to the outer edge portion 21d of the boss cup 21 on the radially outer side of the main shaft 53 with the bolt 52 and the press nut 23.

The plate portion 21b is sandwiched between the flange portion 50a and the flange portion 53a, thereby being capable of increasing torsional rigidity of the boss cup 21 when the rotational power is transmitted from the crankshaft 50 to the main shaft 53.

Further, the cylinder portion 21c is fixed to the crankshaft 50 through intermediation of the plate portion 21b. Further, the cylinder portion 21c is fixed to the main shaft 53 through intermediation of the outer edge portion 21d and the torque converter 54. Thus, the cylinder portion 21c is prevented from expanding toward the radially outer side. Further, the outer edge portion 21d assists torque transmission together with the torque converter 54, thereby being capable of reducing stress applied to each portion.

In the assist motor 103 according to the fourth embodiment, the boss cup 21 is connected to the crankshaft 50 and the main shaft 53. The cylinder portion 21c of the boss cup 21 is liable to expand outward due to the centrifugal force generated by rotation of the rotor 5. Both sides of the cylinder portion 21c in the axial direction are fixed. With this configuration, the cylinder portion 21c is prevented from expanding toward the radially outer side of the cylinder portion 21c.

Further, the boss cup 21 is sandwiched between and coupled to the crankshaft 50 and the main shaft 53. With this configuration, torsional rigidity of the boss cup 21 can be increased when the rotational power is transmitted from the crankshaft 50 to the main shaft 53.

Fifth Embodiment

Next, a rotary electric machine according to a fifth embodiment is described with reference to FIG. 6. In the fifth embodiment, the crankshaft 50 and the main shaft 53 are separated apart from each other, and the boss cup 21 includes an inner edge portion on the main shaft 53 side.

Figure 6:
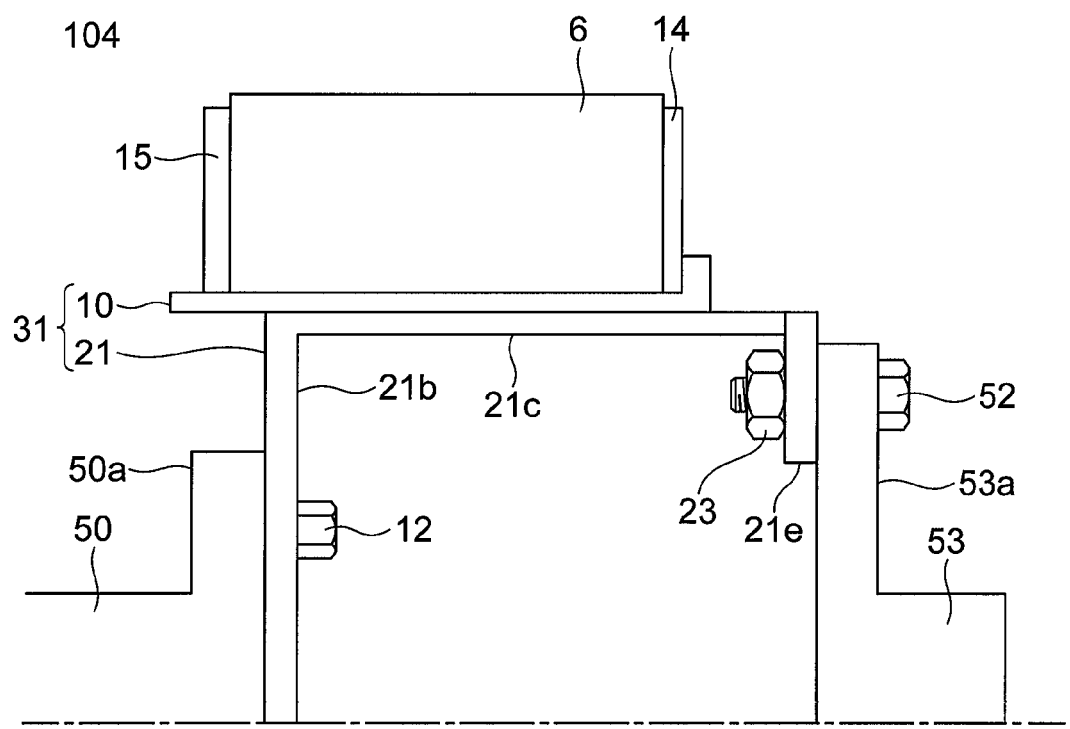
FIG. 6 is a sectional view for illustrating a rotary electric machine according to a fifth embodiment taken along an axial direction of a rotation axis thereof.

FIG. 6 is a sectional view for illustrating the rotary electric machine according to the fifth embodiment taken along an axial direction of a rotation axis thereof. In an assist motor 104 according to the fifth embodiment, the crankshaft 50 and the main shaft 53 are apart from each other in the axial direction. The plate portion 21b of the boss cup 21 is fixed to the flange portion 50a of the crankshaft 50 with the bolt 12. In the boss cup 21, the main shaft 53 side of the cylinder portion 21c is bent to the radially inner side of the main shaft 53 so that an inner edge portion 21e is formed. The inner edge portion 21e is fixed to the flange portion 53a with the bolt 52 and the press nut 23.

The cylinder portion 21c of the boss cup 21 is liable to expand outward due to the centrifugal force generated by rotation of the rotor 5. Both of the crankshaft 50 side and the main shaft 53 side of the cylinder portion 21c are connected in the axial direction. Thus, the cylinder portion 21c is prevented from expanding toward the radially outer side of the cylinder portion 21c.

In the assist motor 104 according to the fifth embodiment, the boss cup 21 is connected to the crankshaft 50 and the main shaft 53. With this configuration, the cylinder portion 21c is prevented from expanding toward the radially outer side of the cylinder portion 21c.

REFERENCE SIGNS LIST 1 stator, 5 rotor, 6 rotor core, 10 boss inner peripheral ring (rotor core retaining portion), 11 rotation sensor rotor, 21 boss cup (torque transmitting portion), 21b plate portion, 21c cylinder portion, 21p first coupling face (first face), 21q second coupling face (second face), 50 crankshaft (first torque input/output shaft), 53 main shaft (second torque input/output shaft), 100, 101, 102, 103, 104 assist motor (rotary electric machine)

The invention claimed is:
1. A rotary electric machine comprising:
a stator; and
a rotor including:
   a rotor core;
   a torque transmitting portion, which is connected to at least one from among a first torque input/output shaft and a second torque input/output shaft, and is formed of a plate-shaped member; and a rotor core retaining portion, which is retained on the torque transmitting portion, is configured to retain the rotor core, and is formed of a plate-shaped member, wherein the torque transmitting portion includes a plate portion having a disk shape, and a cylinder portion that has a cylindrical shape and is fixed to the plate portion, wherein the plate portion is connected to the first torque input/output shaft, and wherein the cylinder portion retains the rotor core retaining portion.

2. The rotary electric machine according to claim 1, wherein the rotor core retaining portion is retained on the torque transmitting portion through welding.

3. The rotary electric machine according to claim 1, wherein the rotor core retaining portion is made of the same material as a material for the rotor core.

4. The rotary electric machine according to claim 1, wherein a rotation sensor configured to measure a rotation angle is mounted to the rotor.

5. The rotary electric machine according to claim 1, wherein the rotor core retaining portion protrudes toward the first torque input/output shaft side with respect to a region of the torque transmitting portion connected to the first torque input/output shaft.

6. The rotary electric machine according to claim 1, wherein the torque transmitting portion is connected to the first torque input/output shaft and the second torque input/output shaft.

7. The rotary electric machine according to claim 1, wherein the torque transmitting portion is sandwiched between and is coupled to the first torque input/output shaft and the second torque input/output shaft.

8. The rotary electric machine according to claim 7,
wherein the torque transmitting portion includes a first face and a second face,
wherein, on the first face, the torque transmitting portion is coupled to the first torque input/output shaft,
wherein, on the second face, the torque transmitting portion is coupled to the second torque input/output shaft, and
wherein the first face is parallel to the second face.

* * * * *